United States Patent [19]

Shimomura

[11] Patent Number: 4,689,640

[45] Date of Patent: Aug. 25, 1987

[54] RECORDING IMPLEMENT AND INK JET RECORDING DEVICE EQUIPPED WITH THE SAME

[75] Inventor: Akihiko Shimomura, Atsugi, Japan

[73] Assignee: Canon Kabushiki Kaisha, Tokyo, Japan

[21] Appl. No.: 904,050

[22] Filed: Sep. 4, 1986

[30] Foreign Application Priority Data

Sep. 12, 1985 [JP] Japan ................................ 60-200521

[51] Int. Cl.⁴ ............................................ G01D 15/16

[52] U.S. Cl. .......................... 346/140 R; 138/DIG. 7

[58] Field of Search ......... 346/140; 138/118, DIG. 3, 138/DIG. 6, DIG. 7; 428/36; 528/487, 485

[56] References Cited

U.S. PATENT DOCUMENTS 4,383,263 5/1983 Ozawa ................................ 346/140

*Primary Examiner*—Joseph W. Hartary

*Attorney, Agent, or Firm*—Fitzpatrick, Cella, Harper & Scinto

[57] ABSTRACT

A recording implement comprises at least an ink storing member and an ink feeding member, wherein a part or all of the site of said recording implement which is in contact with ink is formed of a polyolefin as the main component obtained by addition of an inorganic metal salt as the neutralizing agent for the catalyst during polymerization.

5 Claims, 1 Drawing Figure

RECORDING IMPLEMENT AND INK JET RECORDING DEVICE EQUIPPED WITH THE SAME

BACKGROUND OF THE INVENTION

1. Field of the Invention

This invention relates to a recording implement to be used for a recording device which performs recording by use of an ink (recording liquid), for example, an ink jet recording device which performs recording by discharging small droplets of ink, and particularly to a recording implement improved in corrosion resistance to ink and also to an ink jet recording device equipped with the same.

2. Related Background Art

Heretofore, with a view to avoiding frequent ink supply operation and enabling efficient recording operations in such a recording device using an ink as mentioned above, it has been generally practiced to separate the recording device into the following sections: (1) an ink storing member such as an ink storing vessel having some extent of storing capacity; and (2) an ink feeding member such as an ink feeding tube, etc., for feeding the ink stored in the ink storing member to, for example, a recording means equipped with a discharging mechanism for discharging small droplets of ink etc.

The material constituting the recording implement equipped with such ink storing member, ink feeding member, etc., is required to have the characteristic of excellent corrosion resistance to ink (hereinafter referred to as ink resistance), particularly excellent ink resistance at the face that contacts the ink so that according to deterioration in ink resistance, impurities may not be released into an ink. Also, the characteristics in manufacturing such recording implement that are demanded are easy working, molding or assembling of the material. Further, in some cases, transparency may be also demanded to the extent that the presence of ink can be discriminated.

In the related art, for the recording implement of such a recording device, various resins, glasses, ceramics or metals have been generally utilized as the constituting material. Among them, polyethylene included in a polyolefin is transparent and also has good chemical resistance, and polypropylene has good chemical resistance as well as good impact strength. In addition, it is also good in flow characteristics. These properties enable easy molding of such a polymer with a small thickness or a complicated shape, giving further transparency. Accordingly, they have been frequently utilized for the above recording implement.

However, even in a recording implement formed by use of a polyolefin such as polyethylene or polypropylene having such excellent properties, for example, due to residence of ink for a long time, said recording implement may be damaged by dissolution of itself into an ink and aggregation of fibrous floating matter and the like generated thereby is formed. This causes clogging of the recording means or the ink feeding member, whereby there have been caused the problems that discharging of an ink from the recording means becomes unstable, that an ink may be intermitted and that recording inability is brought about due to an inability to discharge ink in an extreme case.

SUMMARY OF THE INVENTION

The present invention has been accomplished in view of such problems as described above, and the principal object of the present invention is to provide a novel recording implement which is capable of feeding smoothly an ink to a recording means and is free from occurrence of discharging instability of ink, ink intermission or discharging inability of ink, etc., in recording means by eliminating the problems of the recording implement of the related art as described above and also an ink jet recording device equipped with the recording implement. The above objects can be accomplished by the present inventions as specified below.

That is, the present invention provides a recording implement comprising at least an ink storing member and an ink feeding member, wherein a part or all of the site of said recording implement which is in contact with ink is formed of a polyolefin as the main component obtained by addition of an inorganic metal salt as the neutralizing agent for the catalyst during polymerization.

The present invention also provides an ink jet recording device equipped with a recording implement comprising at least an ink storing member and an ink feeding member, wherein a part or all of the site of said recording implement which is in contact with ink is formed of a polyolefin as the main component obtained by addition of an inorganic metal salt as the neutralizing agent for the catalyst during polymerization.

DETAILED DESCRIPTION OF THE PREFERRED EMBODIMENTS

Figure 1:
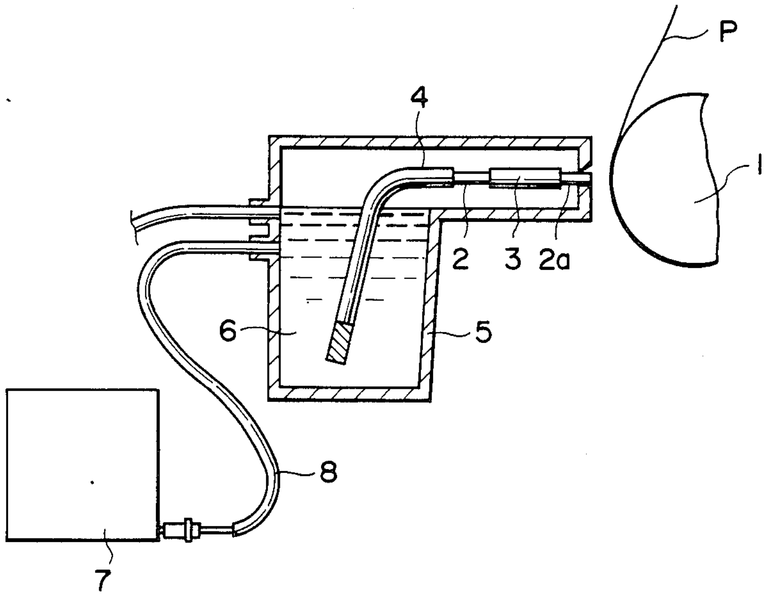
FIG. 1 is a schematic sectional view of an embodiment of the ink jet recording device by use of the recording implement of the present invention.

The recording implement of the present invention is equipped with at least an ink storing member and an ink feeding member as described above, and it can be used for a recording device utilizing ink, more specifically, for example, writing implement such as a fountain pen, a felt pen, an aqueous ball-point pen, or an ink jet recording device. Its shape and size may be set up as desired corresponding to the above recording device. Such a recording implement of the present invention can be prepared by using a polyolefin as a main component such as polypropylene, polyethylene, polystyrene, etc., which is obtained by adding an inorganic metal salt as the neutralizing agent for the catalyst during polymerization, and optionally adding various additives, dispersing agents, etc., to the polymer and forming the polymer into an implement by utilizing various known molding methods.

The polyolefin in the present invention is obtained by adding an inorganic metal salt as the neutralizing agent for the catalyst during polymerization, for example, the catalyst known as the Ziegler-Natta catalyst, etc., and it can be obtained by use of any of the methods, known as the methods for production of polyolefins (e.g., see Plastic Handbook, Murahashi et al, Asakura Shoten P308-P357) except for adding said inorganic metal salt.

Examples of the inorganic metal salt to be added as the neutralizing agent during polymerization of polyolefin may include, for example, those produced from barium, cadmium, zinc, lead, calcium, strontium, magnesium, potassium, etc., as the metal component, silicic acid anhydride, prussic acid, boric acid, phosphorous acid, carbonic acid, thiosulfuric acid, etc., as the inorganic acid radical. At least one kind of these inorganic metal salts may be suitably selected. They should be preferably added in the shape of particles and in amount of about 0.1 to 1.5 phr(per hundred resin), more preferably 0.2 to 0.5 phr.

The action of these inorganic acid salts is not necessarily clear, but it may be considered that deterioration in heat resistance and weathering resistance of polyolefins due to remaining chlorinated catalyst therein is prevented by the action of making the chlorinated catalyst to be used during polymerization of α-olefin harmless as the metal chloride.

Referring now to the drawing, an embodiment of the recording implement formed by use of polypropylene of the present invention is to be explained.

FIG. 1 is a schematic sectional view of an embodiment of the ink jet recording device by use of the recording implement of the present invention.

This recording device performs recording by feeding the ink 6 stored in the main ink tank 7 through the ink feeding tubes 4, 8 and the sub-ink tank 5 to the ink jet nozzle 2, permitting the ink 6 to be discharged as small droplets from the ink jet nozzle 2*a* and attaching the small droplets of ink onto the recording paper P delivered by paper conveying roller 1.

In the device of this embodiment, the main ink tank 7 which is an example of the ink storing member as mentioned in the present invention, and the ink feeding tubes 4, 8 and the sub-ink tank 5 each of which is an example of the ink feeding member for feeding the ink from said storing member to a recording means (constituted of ink jet nozzles 2, 2*a* and the piezoelectric element 3 in this embodiment) are constituted of the polypropylene obtained by using the inorganic metal salt as mentioned in the present invention as the neutralizing agent.

The recording implement of the present invention by use of such a polypropylene is extremely excellent in ink resistance, and free from formation of dissolved matter by dissolution of said recording implement into an ink, particularly at the site which is in contact with the ink even during use for a long time, whereby it is possible to feed the ink smoothly to a recording means and stable recording can be performed over a long time without discharging instability of ink, ink intermission or discharging inability of ink in the recording means.

In the above embodiment, all of the ink storing member and the ink feeding member are constituted of the polypropylene as mentioned in the present invention, but only one of the ink storing member and the ink feeding member, or only a part thereof can be constituted of said polypropylene to give a similar effect.

As described above, according to the present invention, it has been rendered possible to provide a novel recording implement which can feed an ink smoothly to a recording means and is free from discharging instability of ink, ink intermission or discharging inability of ink in the recording means.

The present invention is described in more detail by referring to the following examples and comparative examples.

EXAMPLES 1-6

The sub-ink tank 5 as shown in FIG. 1 was formed by using the polyolefins obtained by use of the inorganic metal salts shown in Table 1 as the neutralizing agent for the catalyst during polymerization.

The sub-ink tank 5 is mounted on an ink jet printer PJ1080A produced by Canon K.K., and the printer was held at 60° C. for 720 hours before carrying out printing test. The results are shown in Table 2. Printing test was conducted by use of three printers, respectively. Each printer had four ink jet nozzles as the recording means.

Separately, the above ink tank 5 was dipped in a test solution comprising 50 wt. % of an aqueous 5 wt. % NaOH solution and 50 wt. % of N-methyl-2-pyrrolidone by heating under the conditions of 120° C. for 10 hours to carry out the dipping test. For each of the test solution after practicing said test, turbidity of the test solution based on JISK0101 was measured by use of a HAZE meter produced by Toyo Seiki Seisakusho K.K. The results are shown in Table 2. The turbidity of each of the test solutions before the test was 0.10.

COMPARATIVE EXAMPLES 1-4

The sub-ink tank 5 was formed in the same manner as in Examples 1-5 except for using the organic metal salts as shown in Table 1 as the neutralizing agent for the catalyst during polymerization, and the printing test and measurement of turbidity of the test solution were conducted. The results are shown in Table 2.

TABLE 1

| | Polyolefins employed | | |
|---|---|---|---|
| | Polyolefin | Neutralizing agent for the catalyst during polymerization | Polymer |
| Example 1 | Polypropylene | Calcium carbonate | Block polymer |
| Example 2 | Polypropylene | Magnesium carbonate | Block polymer |
| Example 3 | Polypropylene | Postassium silicate | Homopolymer |
| Example 4 | Polypropylene | Barium borate | Random copolymer |
| Example 5 | Polypropylene | Magnesium phosphite | Block copolymer |
| Example 6 | Polyethylene | Barium carbonate | Polyethylene + vinyl acetate (5%) copolymer |
| Comparative example 1 | Polypropylene | Calcium stearate | Block copolymer |
| Comparative example 2 | Polypropylene | Cadmium stearate | Block copolymer |
| Comparative example 3 | Polypropylene | Barium laurate | Homopolymer |
| Comparative example 4 | Polyethylene | Calcium stearate | Polyethylene + vinyl acetate (5% copolymer) |

TABLE 2

| | After storage of printer at 60° C. for 720 hours | | |
|---|---|---|---|
| | Presence of floating matter in ink (visual observation) | Printing test results | Turbidity of test solution |
| Example 1 | none | Good without nozzle clogging | 0.10 |
| Example 2 | none | " | 0.15 |
| Example 3 | none | " | 0.10 |
| Example 4 | none | " | 0.15 |
| Example 5 | none | " | 0.14 |
| Example 6 | none | " | 0.15 |
| Comparative example 1 | Floating matter slightly present | Ink non-discharging generated due to nozzle clogging of one nozzle in one (four nozzles of 3 printers) | 0.30 |
| Comparative example 2 | Floating matter minutely present | Printing disturbance occured with pressure loss increase during ink | 0.20 |
| Comparative example 3 | Floating matter minutely present | Printing disturbance occured with pressure loss increase during ink | 0.20 |
| Comparative example 4 | Floating matter minutely present | Ink non-discharging generated due to nozzle clogging of one nozzle in one (four nozzles of 3 printers) | 0.30 |

What is claimed is:

1. A recording implement comprising at least an ink storing member and an ink feeding member, wherein a part or all of the site of said recording implement which is in contact with ink is formed of a polyolefin as the main component obtained by addition of an inorganic metal salt as the neutralizing agent for the catalyst during polymerization.

2. A recording implement according to claim 1, wherein said polyolefin is polypropylene or polyethylene.

3. A recording implement according to claim 1, wherein the inorganic acid radical of said inorganic metal salt is selected from silicic acid anhydride, prussic acid, boric acid, phosphorous acid, carbonic acid and thiosulfuric acid.

4. An ink jet recording device equipped with a recording implement comprising at least an ink storing member and an ink feeding member, wherein a part or all of the site of said recording implement which is in contact with ink is formed of a polyolefin as the main component obtained by addition of an inorganic metal salt as the neutralizing agent for the catalyst during polymerization.

5. An ink jet recording device according to claim 4, wherein said polyolefin is polypropylene or polyethylene.

* * * * *